United States Patent
Andrés Bou et al.

(10) Patent No.: US 9,564,729 B2
(45) Date of Patent: Feb. 7, 2017

(54) DEVICE FOR EMITTING SUPER-CONTINUOUS WIDE-BAND LIGHT AND USES THEREOF

(71) Applicant: Universitat de València, Valencia (ES)

(72) Inventors: Miguel Vicente Andrés Bou, Valencia (ES); José Luis Cruz Muñoz, Valencia (ES); Antonio Díez Cremades, Valencia (ES); Yury Barmenkov, Valencia (ES); Pere Pérez Millán, Valencia (ES)

(73) Assignee: Universitat de València, Valencia (ES)

( * ) Notice: Subject to any disclaimer, the term of this patent is extended or adjusted under 35 U.S.C. 154(b) by 0 days.

(21) Appl. No.: 14/437,418

(22) PCT Filed: May 5, 2014

(86) PCT No.: PCT/ES2014/070382
§ 371 (c)(1),
(2) Date: Jan. 8, 2016

(87) PCT Pub. No.: WO2014/181018
PCT Pub. Date: Nov. 13, 2014

(65) Prior Publication Data
US 2016/0164242 A1 Jun. 9, 2016

(30) Foreign Application Priority Data
May 7, 2013 (ES) .................................. 201300435

(51) Int. Cl.
*H01S 3/30* (2006.01)
*H01S 3/067* (2006.01)
(Continued)

(52) U.S. Cl.
CPC ............. *H01S 3/067* (2013.01); *H01S 3/0092* (2013.01); *H01S 3/0675* (2013.01);
(Continued)

(58) Field of Classification Search
CPC ........ H01S 3/067; H01S 3/0675; H01S 3/108; H01S 3/1618; H01S 3/094007; H01S 3/094003; H01S 3/0092
(Continued)

(56) References Cited

U.S. PATENT DOCUMENTS

| | | | | |
|---|---|---|---|---|
| 5,577,057 A | * | 11/1996 | Frisken | H01S 3/1112 372/18 |
| 2013/0058366 A1 | * | 3/2013 | Leproux | H01S 3/06758 372/25 |

OTHER PUBLICATIONS

International Search Report dated Jul. 1, 2014, relating to International Application No. PCT/ES2014/070382.
(Continued)

*Primary Examiner* — Kinam Park
(74) *Attorney, Agent, or Firm* — Honigman Miller Schwarz and Cohn LLP

(57) ABSTRACT

The disclosed broadband supercontinuum light emitting device includes a nonlinear optical fiber, a pump system, a cavity, and an active medium. The active medium may comprise an active fiber and may be located inside the cavity. The active medium is configured and arranged, by means of a pumping provided by the pump system, to generate and emit chaotic pulses of laser light towards the nonlinear optical fiber, which excite the nonlinear effects thereof for the generation and emission of supercontinuum light in the form of pulses of light distributed randomly over time. Numerous uses of the device are disclosed for multiple applications that require a low-cost, very bright light source with an adequate broadband spectrum.

17 Claims, 7 Drawing Sheets

(51) Int. Cl.
H01S 3/108 (2006.01)
H01S 3/094 (2006.01)
H01S 3/00 (2006.01)
H01S 3/16 (2006.01)
G02F 1/35 (2006.01)

(52) U.S. Cl.
CPC ........ H01S 3/094007 (2013.01); H01S 3/108 (2013.01); H01S 3/1618 (2013.01); G02F 2001/3528 (2013.01)

(58) Field of Classification Search
USPC .......................................................... 372/6
See application file for complete search history.

(56) References Cited

OTHER PUBLICATIONS

Martinez-Rios S. A., Torres-Gomez I., Anzueto-Sanchez, Selvas-Aguilar R., "Self-pulsing in a double-clad ytterbium fiber laser induced by high scattering loss". Optics Communications, Oct. 22, 2007 North-Holland Publishing Co. Amsterdam, NL Oct. 22, 2007 vol. 281 No. 4, pp. 663-667.

Chernikov S. V., Zhu Y., Taylor J. R., "Supercontinuum Self-Q-Switched Ytterbium Fiber Laser". Optics Letters, Mar. 1, 1997 Optical Society of America, US Mar. 1, 1997 vol. 22 No. 5, pp. 298-300.

\* cited by examiner

DEVICE FOR EMITTING SUPER-CONTINUOUS WIDE-BAND LIGHT AND USES THEREOF

CLAIM OF PRIORITY

Filed under 35 U.S.C. §371, this application constitutes a 371 application of International Application No. PCT/ES2014/070382 filed on May 5, 2014. The contents of that international application are incorporated herein in their entirety.

FIELD OF THE ART

The present invention relates, in general, to a broadband supercontinuum light emitting device, which includes a nonlinear optical fiber that generates and emits supercontinuum light when its nonlinear effects are excited through pulses of laser light, and, more specifically, a device in which said pulses of laser light are chaotic in nature and that emits supercontinuum light in the form of pulses of light distributed randomly over time.

The invention also relates to a series of uses of the device proposed for multiple applications

PREVIOUS STATE OF THE ART

Several broadband supercontinuum light emitting devices are known in the state of the art, some of which are mentioned as follows.

The supercontinuum light sources available on the market are based on picosecond lasers working according to a phase synchronization regime of the laser cavity modes, normally known as "mode-locking", which excite nonlinear photonic crystal fibers. Mode-locked laser technology is expensive and, therefore, supercontinuum sources of power greater than 1 W cost around 40,000 euros. These sources have two important properties: on the one hand, they constitute an alternative to halogen lamps for spectroscopy and, on the other hand, they generate a coherent frequency comb applicable in metrology and spectroscopy with temporal resolution.

Other supercontinuum light sources use as an excitation system a fiber laser system working in a regime of switching the Q factor of the cavity, normally referred to as "Q-switching", which comprises a doped fiber gain medium that is being continuously pumped by a pump source, and provides laser pulses with higher pulse energies and longer pulse durations than those generated by mode-locked lasers.

Both mode-locked lasers and Q-switched lasers require some type of amplitude, phase or frequency modulator, whether active or passive.

Patent document number CN102130413 describes a full optical fiber type supercontinuum laser source based on a multi-component-doped silica optical fiber. This document does not indicate that the fiber used is nonlinear. The authors base their work on a semiconductor laser pump source, an Yb doped double-clad optical fiber, in a Q-switch configuration, and a multi-component-doped silica optical fiber to obtain a supercontinuum laser source with a simple structural form, high output power and a wide and flat spectral range.

The cavity of the laser source proposed in CN102130413 uses two high reflectivity Bragg gratings and, therefore, the efficiency of the laser light emitted must necessarily be very low since high reflectivity reflectors are required on both ends of the cavity.

International application WO2011124867A1 describes a supercontinuum light emitting device capable of emitting light between the infrared range and the ultraviolet range, comprising a laser source and a non-linear microstructured optical fiber arranged for receiving the laser beam emitted by the laser source and generating and emitting supercontinuum light, whereby the device includes means for varying the duration of the emitted supercontinuum light pulses.

In general, optical fiber lasers (except on rare occasions, as is the case with CN102130413) do not initially provide sufficient power and require an amplification stage in order to be able to generate supercontinuum light, which doubles the number of components with regard to being able to use the laser alone.

The document "$Cr^{4+}$:YAG chirped-pulse oscillator", by New J Phys. 2008 Aug. 10. pii: 083022. Sorokin E et al. Institut für Photonik, T U Wien, Gusshausstr. 27/387, A-1040 Vienna, Austria, describes a chirped-pulse operation of a passive Cr:YAG mode-locked laser. Different regimes of operating the laser around zero dispersion were investigated. They show that for a certain laser configuration, the transition to positive dispersion allows the energy of the output pulse to be increased by five times, although this increase is limited by the appearance of multi-pulsing or chaotic mode-locking. The output pulses have a duration of 1.4 ps and have been reduced to 120 fs in a 3 m piece of silica fiber, which allows supercontinuum light to be generated in a nonlinear fiber. The form of the spectrum and the stability of the chirped-pulse regime strongly depends on the amount and form of the dispersion inside the cavity.

Note: Chirped pulse amplification (CPA) is a technique for amplifying an ultrashort laser pulse up to the petawatt level with the laser pulse being stretched out temporally and spectrally prior to amplification.

The document "Chaos in the pulse spacing of passive Q-switched all-solid-state lasers", Marcelo Kovalsky and Alejandro Hnilo, OPTICS LETTERS/Vol. 35, No. 20/Oct. 15, 2010, describes the experimental and theoretical verification that, in a diode-pumped Cr-YAG Q-switched laser, the instabilities in the pulse spacing ("jitter") are ruled by low-dimensional deterministic chaos. The characterization achieved in the study of the dynamics studied and its main parameters opens a door to effective ways of reducing this jitter, which is of practical interest, through mechanisms of controlling chaos. Conversely, the difficulty in predicting the interpulse spacing makes this system attractive for high power encrypted communications, in free-space propagation, based on a robust chaotic laser frequency-modulation.

It can therefore be asserted that a person skilled in the art could understand, through these two documents, the instability problems involved in using a chaotic regime in a Q-switched laser or in the use of a chaotic laser, given that it does not allow light to be emitted in a controlled manner.

DESCRIPTION OF THE INVENTION

It appears necessary to offer an alternative to the state of the art that covers the gaps found therein, providing a supercontinuum light emitting device that is efficient but easier and more economical than those known, dispensing with a significant part of the components that are included in the supercontinuum light devices of the state of the art.

For this purpose, the present invention relates to a broadband supercontinuum light emitting device comprising:

a nonlinear optical fiber;
a pump system;
a cavity; and an active medium, located inside said cavity, configured and arranged to, by means of a pumping provided by said pump system, generate and emit pulses of laser light towards said nonlinear optical fiber which excite the nonlinear effects thereof in order to generate and emit said supercontinuum light by an output end of the nonlinear optical fiber.

Unlike known broadband supercontinuum light emitting devices, in the device proposed by the present invention, the cavity and the active medium thereof are configured so that the pulses of laser light generated and emitted by the active medium are chaotic pulses of light that excite the nonlinear effects of the nonlinear optical fiber to make the nonlinear optical fiber generate and emit supercontinuum light in the form of pulses of light distributed randomly over time.

In a preferred embodiment, the device of the present invention comprises at least one element of low reflectivity (<0.1) arranged at or near the output end of the nonlinear optical fiber, where said low reflectivity preferably has a value of between −10 dB and −70 dB, and more preferably between −30 dB and −50 dB.

In one embodiment, the aforementioned element of low reflectivity is a non-collimator end of the nonlinear optical fiber cut at a non-right angle, while in an alternative embodiment, the element of low reflectivity is a partially reflective collimator end of the output end of the nonlinear optical fiber, such as a microsphere-shaped fused end, a collimator lens with an anti-reflective coating assembled on the output end of the nonlinear optical fiber or an external collimator connected to the output end, cut at a non-right angle, of the nonlinear optical fiber.

According to an embodiment, the nonlinear optical fiber is a nonlinear microstructured fiber.

In a very preferred embodiment, especially because of the high efficiency obtained therewith, the nonlinear optical fiber is arranged inside said cavity, in general fused with the active medium, although in other less preferred embodiments it may be arranged outside, in which case the element of low reflectivity is arranged at the end of the cavity and the light that comes out of the cavity through said low reflectivity element is focused on the nonlinear optical fiber, although the efficiency of this arrangement is much lower, since there are problems relating to loss of light and to instability, because any small reflection towards the laser destabilizes it and also the vibrations may affect the focalization of the light on the nonlinear optical fiber.

According to an embodiment, the aforementioned active medium comprises a portion of active fiber with an output end connected to an input end of the nonlinear optical fiber, and the pump system comprises a pump diode arranged at an input end of said portion of active fiber to emit light inwards.

In a preferred variant of said embodiment, the active fiber has a core doped with ytterbium (Yb), although in other less preferred variations, it is doped with at least one of the following elements: erbium (Er), neodymium (Nd), thulium (Tm) and holmium (Ho), whereby the nonlinear active fiber must be designed such that it works in a nonlinear regime at the wavelength emitted by the active fiber which, for example, in the case of Erbium doping, is within the band of 1550 nm.

In accordance with an embodiment, the device of the invention comprises a section of adapting fiber that interconnects the output end of the portion of active fiber with the input end of the nonlinear optical fiber.

According to an embodiment, the device comprises at least one element of high reflectivity (>0.9) arranged prior to an input end of the portion of active fiber, before or after the insertion point of the light provided by said pump diode.

In addition, the device of the invention, according to an embodiment, comprises an additional portion of optical fiber connected to an input end of the portion of active fiber, in which said element of high reflectivity is arranged, and a long-period grating which acts as a band-pass filter centered on the wavelength for which the active fiber has a maximum spontaneous emission, with the free end of the additional portion of optical fiber ending at a non-right angle.

The device of the present invention is configured, in accordance with an embodiment, to emit pulses of light with a width on the order of nanoseconds and an average emission rate on the order of one thousand pulses per second.

Advantageously, in accordance with a preferred embodiment, all components of the device of the invention are made of fiber and are connected by fusion.

The device proposed by the present invention represents an alternative to the known conventional supercontinuum light emitting devices, whereby it obtains a power spectral density that is similar to that obtained with said conventional emitting devices, but improved with regard to that obtained with broad spectrum lamps. The device proposed by the invention does not use mode-locked or Q-switched lasers, which constitutes a crucial simplification in the number of components, and it also does not require additional amplification stages since the chaotic laser itself emits very high energy pulses, i.e. high intensity pulses. The excitation system of the nonlinear effects on photonic crystal fibers consists of a very simple optical fiber "laser" (see comment below), of chaotic nature, but with adequate properties for exciting the nonlinear optical fiber in a nanoseconds regime. The key is the drastic cheapening of the source and thus make very affordable the supercontinuum source for its incorporation into measurement equipments of multiple purposes and the development of spectroscopic techniques in many fields, which will multiply the number of possible users and applications.

The cheapening is caused by two characteristics of the invention. On one hand, no type of amplitude, phase or frequency modulator, whether active or passive, is needed (which is required by mode-locked and Q-switched lasers) and, on the other hand, (contrary to most optical fiber lasers) an amplification stage is not required in order to be able to generate supercontinuum light.

The term "laser" was used in quotes above because actually, strictly speaking, the device of the present invention could only be called chaotic laser if the nonlinear optical fiber was extracted therefrom, since if this is not the case, the light is emitted in broad band, and it is arguable whether or not this type of emission can be called a "laser" emission. In any case and taking into account the comment above, in order to clarify the description of the invention, the term chaotic laser is used in various parts of this specification to refer to the set of elements of the device that do not include the nonlinear optical fiber.

It can therefore be said that the differentiating aspect of the device of the present invention lies in the combination of a chaotic laser with nonlinear optical fiber. The key differentiating factor is the chaotic nature of the emission, regarding both the internal pump laser and the white light finally emitted by the output end of the nonlinear optical fiber.

The device proposed by the present invention constitutes a point light source with high power and low cost that covers part of the ultraviolet spectrum, the entire visible spectrum and the near-infrared spectrum, preferably between 400 nm and 2400 nm, generating intense pulses with varying durations of around 1 ns and peak powers greater than 1 kW.

The present invention also relates to a series of uses of the proposed device, such as, for example, as halogen lamp (with an adequate broadband spectrum, low-cost and a much brighter light than that of traditional halogen lamps), and other LED broadband sources.

The performance features of the device proposed by the invention are unique for optical spectroscopy applications. The key is the point-like nature of the source and an intensity of various orders of magnitude greater than that which can be reached with a traditional halogen light source with a spatial filter, which represents a crucial improvement for imaging techniques, characterization of small samples, detection of low concentrations of active substances, characterization of isolated nanoparticles, etc.

It therefore allows the detection of signals several orders of magnitude lower than those detected using traditional systems in the following fields:

Biomedical Imaging:
  Fluorescence lifetime imaging microscopy: an imaging technique that is used in confocal microscopy. Supercontinuum sources allow the excitation band to be selected and adjusted to optimum levels in each case, using a single laser source.
  Optical coherence tomography. Signal acquisition and processing technique that provides 3D images in light diffusing mediums, such as biological tissues. Supercontinuum sources simultaneously provide ultra-high resolution and ultra-high sensitivity.
  Molecular imaging. An imaging technique to monitor molecular processes in living organisms. Supercontinuum sources provide the entire band of wavelengths necessary with a single light source that allows a band of 650-900 nm to be covered, which is the relevant band for this technique.

Measuring Instruments:
  Characterization of optical fibers and optical fiber components
  Characterization of materials: Supercontinuum sources provide an ultra-extensive band, a Gaussian beam that can be easily focused, coupled to the optical fiber, which allows multiple optical fiber equipment or equipment located on different work tables to be easily compatible.

Industrial Equipment:
  Classification of pieces and materials: Supercontinuum sources simultaneously provide visible and infrared light, which allows for improved efficiency in robots classifying pieces and materials, differentiation between organic and inorganic materials, fruit and vegetables, plastics and wood, etc.
  Inspection equipment. White light interferometry for detecting cracks and defects, and for quality control.

Fundamental Research:
  Nanophotonics: Supercontinuum sources provide the intensity needed to individually detect and characterize nanoparticles, optical nanocavities and nanostructured devices, as they allow for a good focalization and provide high intensity.
  Spectroscopy: all spectroscopical techniques may benefit from the advantages of supercontinuum sources as they provide an improvement of various orders of magnitude in intensity, preserving the point-like nature of the light source.

The present invention relates to various uses of the device proposed for all of the aforementioned fields.

Advantages of the Invention

The invention allows sources to be implemented that are lower in cost than the solutions used until now. The impact of the device proposed by the present invention on the improvement to the quality of life and sustainability arises from the medical applications that will benefit from an improvement in diagnostic and imaging techniques, the improvement in spectroscopical techniques that will allow the detection of molecules in very small concentrations and, therefore, safety, advanced detection of illnesses and surgical navigation through molecular imaging. Solar power plants need to correctly characterize the optical surfaces by means of portable and low-cost instruments, and to characterize in broad band the optical atmospheric conditions. The improvement in the characterization of photonic devices will also contribute to optical communications. Fundamental research will also widely benefit from the result of the device of the present invention on providing a very affordable equipment to research groups working in any of the optical spectroscopy techniques, for example for the characterization of nanoparticles, which in turn may be applied in the treatment of cancer and other illnesses.

BRIEF DESCRIPTION OF THE DRAWINGS

The previous and other advantages and features will be more fully understood from the following detailed description of several embodiments with reference to the attached drawings, which must be interpreted in an illustrative and non-limiting manner, in which.

DETAILED DESCRIPTION OF THE EMBODIMENTS

Figure 1:
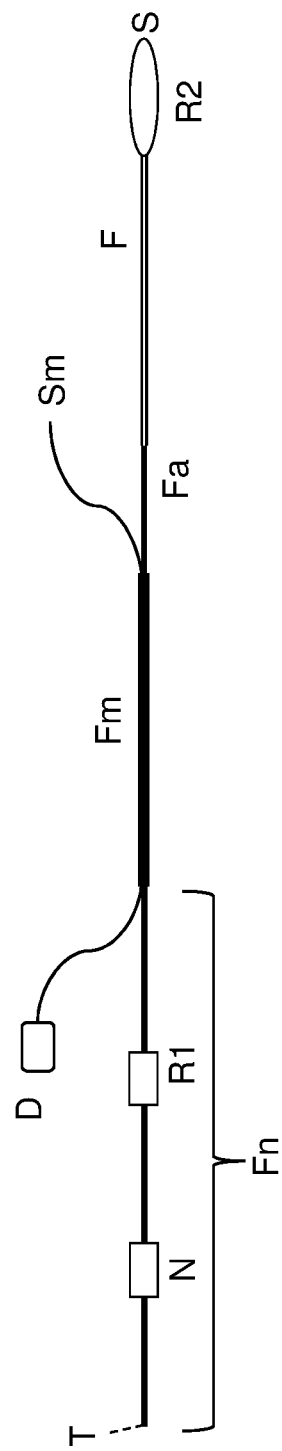
FIG. 1 is a schematic representation of the device proposed by the present invention for an embodiment.

FIG. 1 schematically shows an embodiment of the broadband supercontinuum light emitting device proposed by the present invention, which comprises the following elements:

a pump system that includes a pump diode D, for example of 5W and 980 nm;

an active medium formed by a portion of active fiber Fm with its core doped with Yb and pumped on the cladding, with one input end connected to pump diode D, in order to be pumped thereby;

a nonlinear optical fiber F, such as a microstructured fiber;

a section of adapting fiber Fa (for example SM980) that interconnects the output end of the portion of active fiber Fa with the input end of the nonlinear optical fiber F, adapting them to each other;

an element of low reflectivity R2 arranged at the output end of the nonlinear optical fiber F;

an additional portion of optical fiber Fn connected to the input end of the portion of active fiber Fm, in which an element of high reflectivity R1 is arranged, such as a Bragg grating with very high reflectivity, and a long-period grating N that acts as a band-elimination filter centered on the wavelength (for example at 1030 nm) for which active fiber Fm has a maximum spontaneous emission, whereby free end T of the additional portion of optical fiber Fn ends at a non-right angle, for the purpose of ensuring that the light would not be reflected at that end of fiber Fn, so that the emission would not be destabilized and the necessary pulse chaotic regime would not be spoiled.

The final output of the device has been indicated in FIG. 1 by means of reference S, where the supercontinuum light is emitted, and an extraction point of the residual pumping of active fiber Fm has been indicated by means of reference Sm.

The cavity of the device of FIG. 1 is defined between R1 and R2, and the output of pump diode D could be connected, for an embodiment not shown, before R1 (in other words, to the left, according to the position shown in FIG. 1).

The technical characteristics of nonlinear microstructured fiber F include a small mode area and a chromatic dispersion that are optimized for the working wavelength of the laser. In a specific implementation of the device of the present invention, as for the construction thereof an active fiber doped with Yb that emits around 1030 nm has been used, the nonlinear microstructured fiber that was used was constructed with a zero dispersion near 1030 nm, being anomalous for wavelengths greater than 1030 nm and normal for wavelengths lower than 1030 nm. Moreover, the curve of the group's index versus the wavelength was optimized in order to achieve a rapid increase at long wavelengths. The optimization of fiber F allows the spectral range of the white light source to be extended to its maximum from 400 to 2400 nm, while a non-optimum embodiment of fiber F partially reduces the bandwidth of the supercontinuum light emitted, but does not render the device completely unusable.

Figure 2:
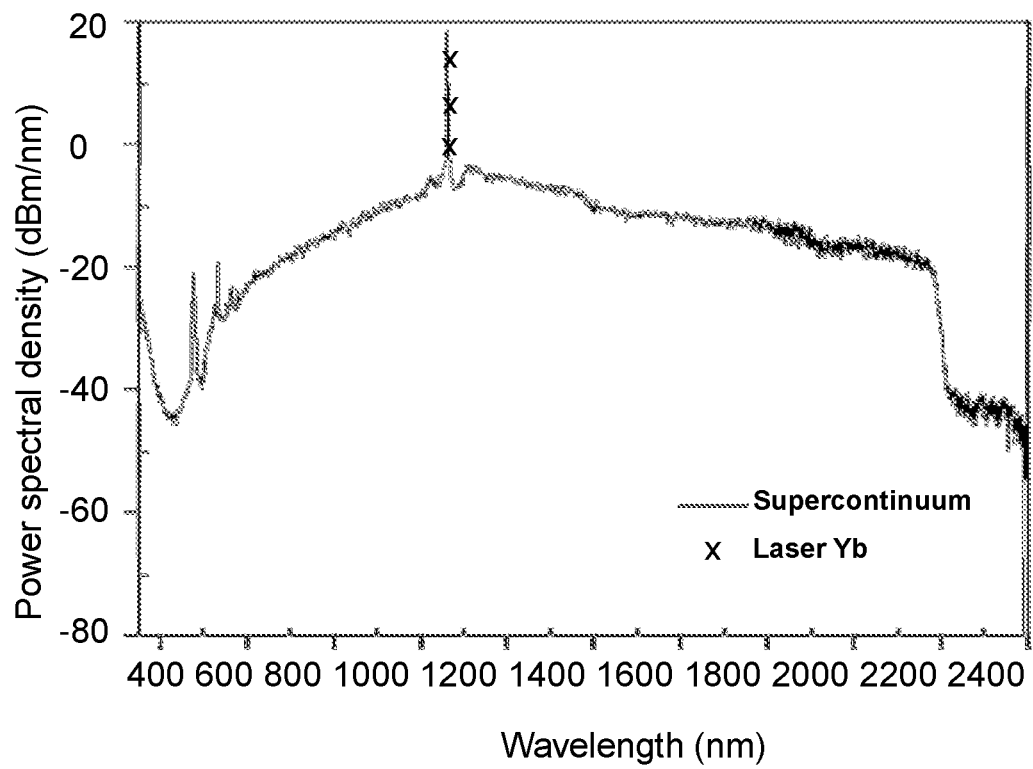
FIG. 2 is a graph that shows the spectrum of the light signal emitted by the output of the device of FIG. 1.

An experimental assembly of the device of FIG. 1 was made, in which the 5W diode D pumps the active fiber doped with Yb and the laser cavity was adjusted to work in the chaotic pulsed regime, and said cavity included a nonlinear microstructured fiber F manufactured in the laboratory of these inventors, in which the nonlinear effects induced gave rise to the emission of white light. The spectrum of the supercontinuum light emitted covers a significant part of visible light from around 400 nm to more than 2400 nm, with 156 mW in power, and has an intensity on the order of −10 dBm/nm, as can be seen in FIG. 2, with a total power obtained of 264 mW, including 108 mW of power relating to the laser, in other words to the photons of the active medium not transformed into other wavelengths (energy peak indicated in FIG. 2 as "Laser Yb").

Figure 3:
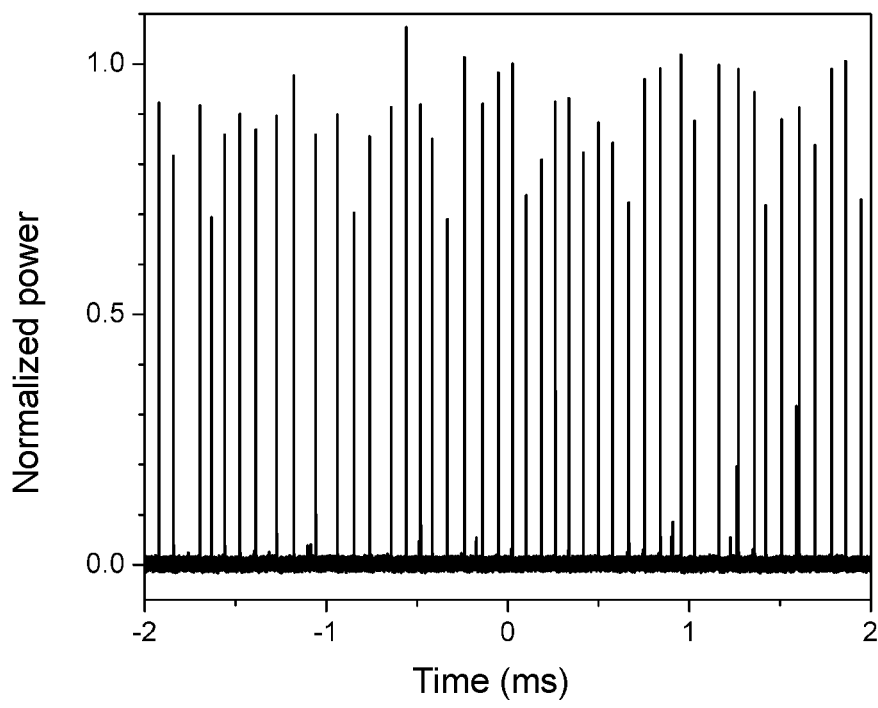
FIG. 3 is a graph that relates normalized power with time, and that shows the train of chaotic pulses generated at the output of the device of FIG. 1.

FIG. 3 shows a graph that relates normalized power with time, and that shows the train of chaotic pulses generated at the output S of the device of FIG. 1.

Figure 4:
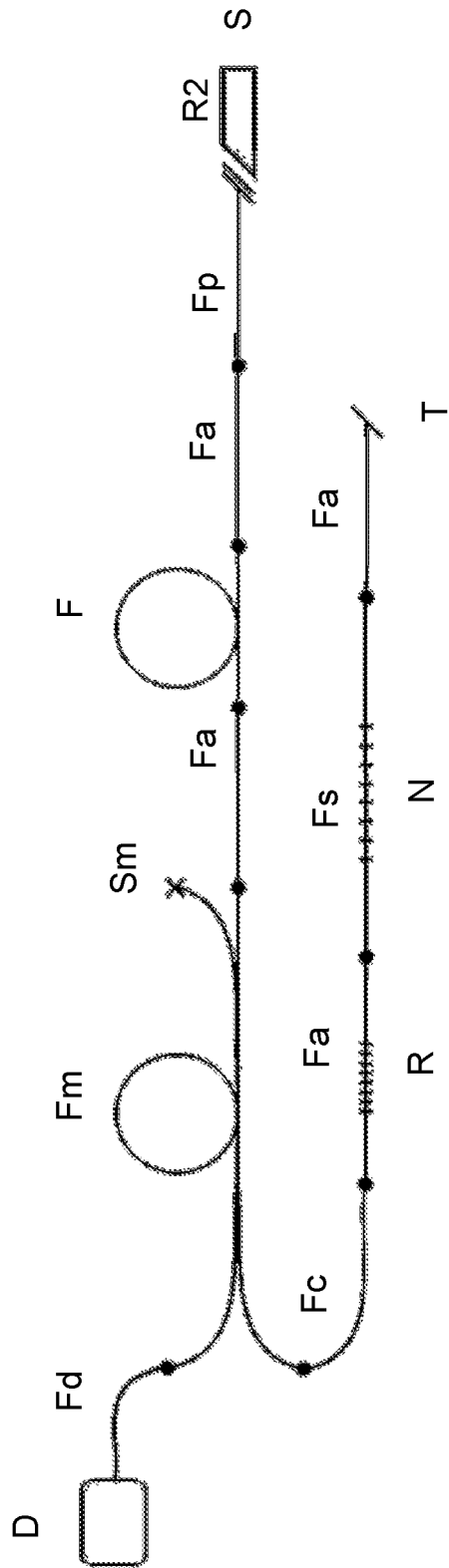
FIG. 4 shows another implementation of the device proposed by the present invention for a more elaborate embodiment than that of FIG. 1.

FIG. 4 shows another embodiment of the device proposed by the present invention, where the device comprises a greater number of elements than that of FIG. 1, in particular a greater number and variety of portions of fibers.

The symbols shown in FIG. 4 have the following meaning:
● Splice
X End with an irregular cut
/ APC Connector
// UAPC Connector The device of FIG. 4 is formed by the same elements included in that of FIG. 1 plus a series of additional elements arranged between the end of nonlinear fiber F and output S, and a more powerful pump diode. For its construction, a pump diode of 976.5 nm with 7.6 W of maximum power was used with multi-mode fiber Fd, which drives the pumping power to the cladding of active fiber Fm, the core of which is doped with Yb, the residual pumping power is extracted at point Sm, the light emitted by active fiber Fm is driven to nonlinear microstructured fiber F by means of a section of adapting fiber Fa, SM 980 model, the element of high reflectivity R is a Bragg grating formed in an SM 980 fiber, long-period grating N was formed in a PS 980 fiber, the section of fiber Fc that connects fiber Fm with fiber Fa of the Bragg grating is an HI 980 fiber, and the APC connector assembled in fiber Fa connected to fiber Fs constitutes end T. Light output S is provided by a collimator. The output end of nonlinear optical fiber F is connected to a section of a polarization maintaining fiber Fp, PM 980 with a UAPC connector, through another section of adapting fiber Fa, SM 980. This UAPC connector provides the low reflectivity required as a result of the fiber being cut at a non-right angle and supports high output powers better than an APC connector. The PM 980 fiber assembled with the UAPC connector may be substituted for another type of fiber that does not maintain the polarization.

An experimental test was carried out with the implementation of the device of FIG. 4 by applying a pump current of 8.51 A, which provides an optical pumping power of 7.6 W, whereby at output S an optical output power of 600 mW was obtained, including that corresponding to the supercontinuum light and that corresponding to the residual laser light.

FIGS. 5, 6, 7a, 7b, 7c, 8a and 8b show the results obtained for the aforementioned experimental test with the device of FIG. 4 through a series of graphs which are described below, and which values were obtained through measurements taken at output S with the "New Focus®" Model 1801 silicon photoreceiver, which operates within a range of 0 to 125 MHz and has a nominal optical bandwidth from 300 to 1050 nm. Average power was represented with arbitrary units (a.u.).

Figure 5:
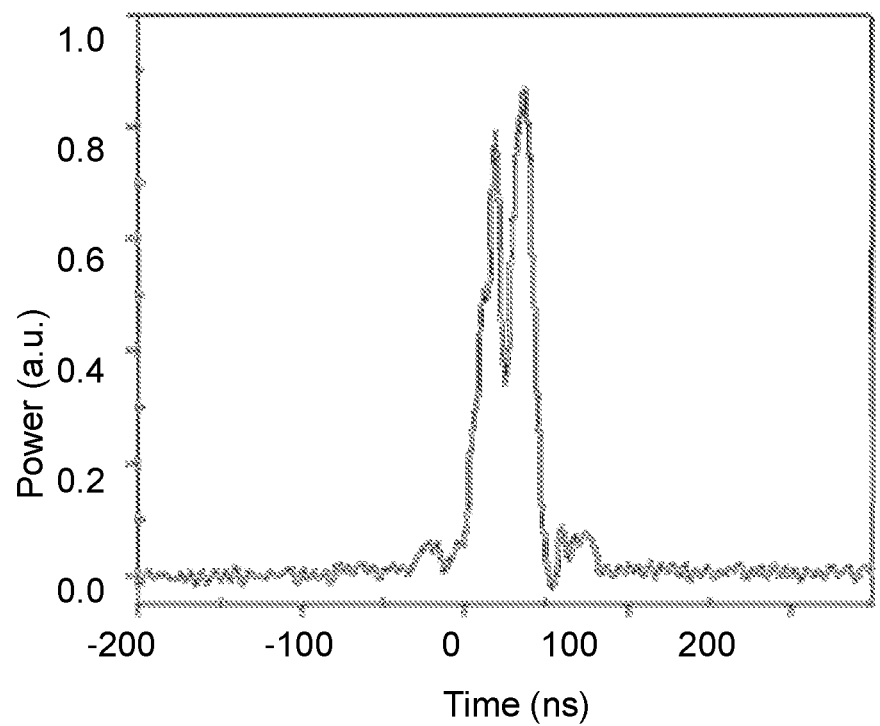
FIGS. 5, 6, 7a, 7b, 7c, 8a and 8b are graphs that show various measurements of the output signal of the device of FIG. 4.
Figure 6:
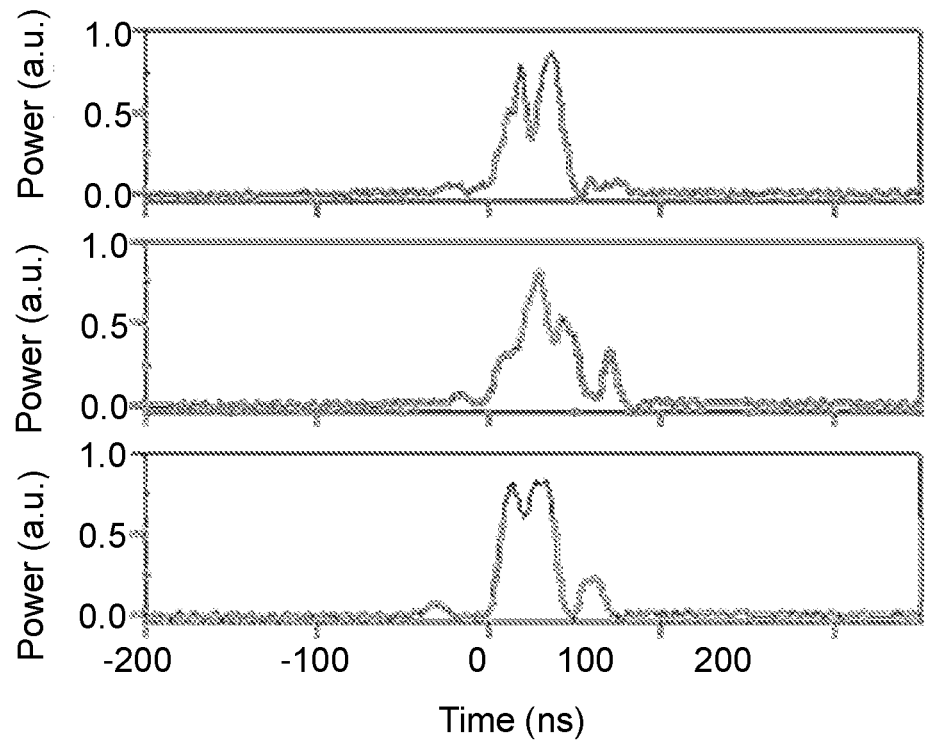

FIG. 5 shows the measurements taken for a single pulse (self-triggered shot) of the supercontinuum light obtained, which is shown in detail, and FIG. 6 shows, by means of three related graphs, another three pulses taken randomly (also self-triggered shots), each with different forms.

Figure 7A:
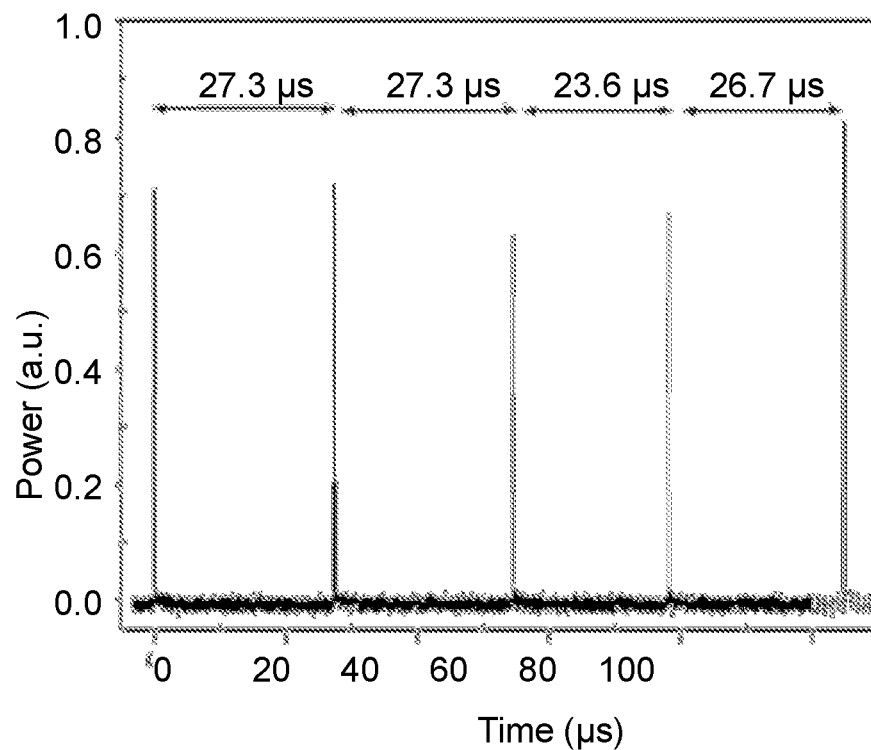
Figure 7B:
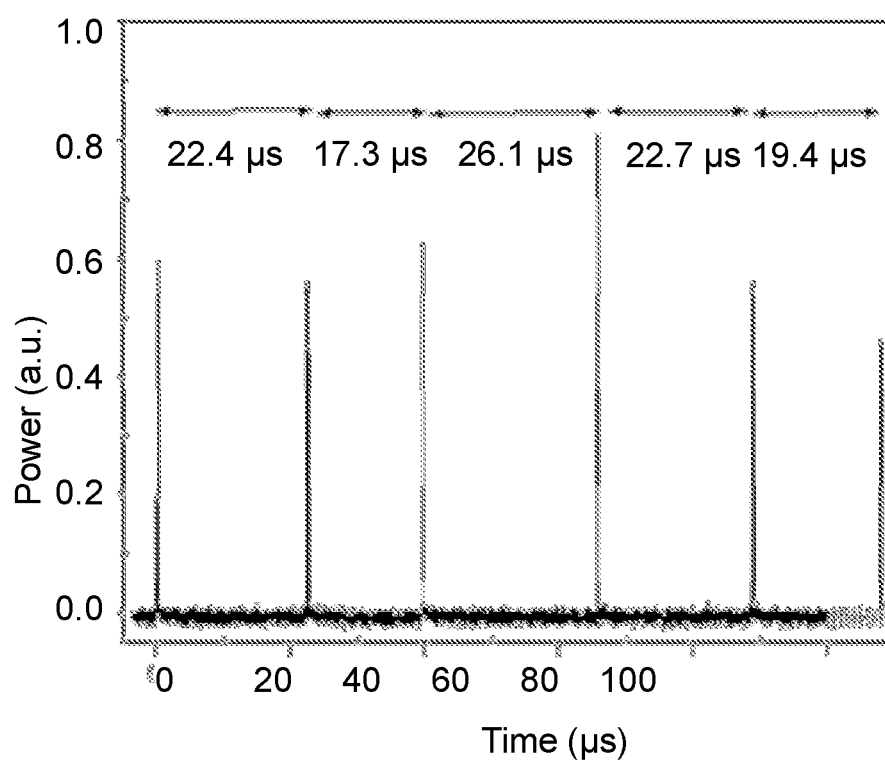
Figure 7C:
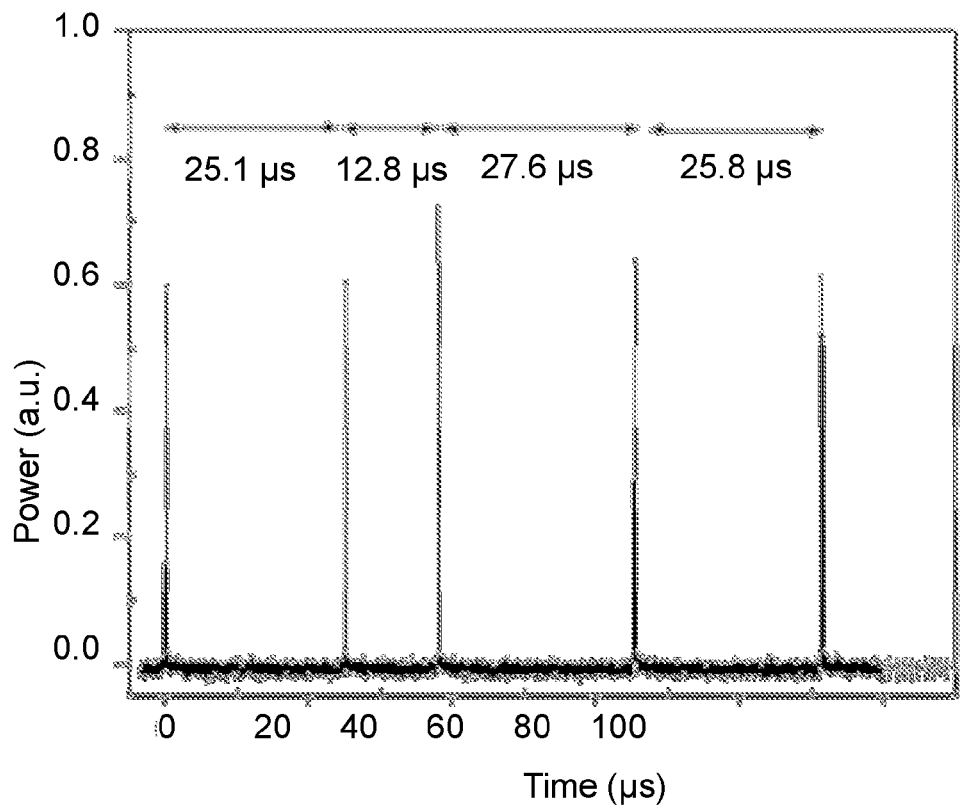

FIGS. 7a to 7c show three respective examples of measurements obtained for a single shot, taken randomly, where different pulse trains can be observed in which the pulses are distributed randomly over time.

Figure 8A:
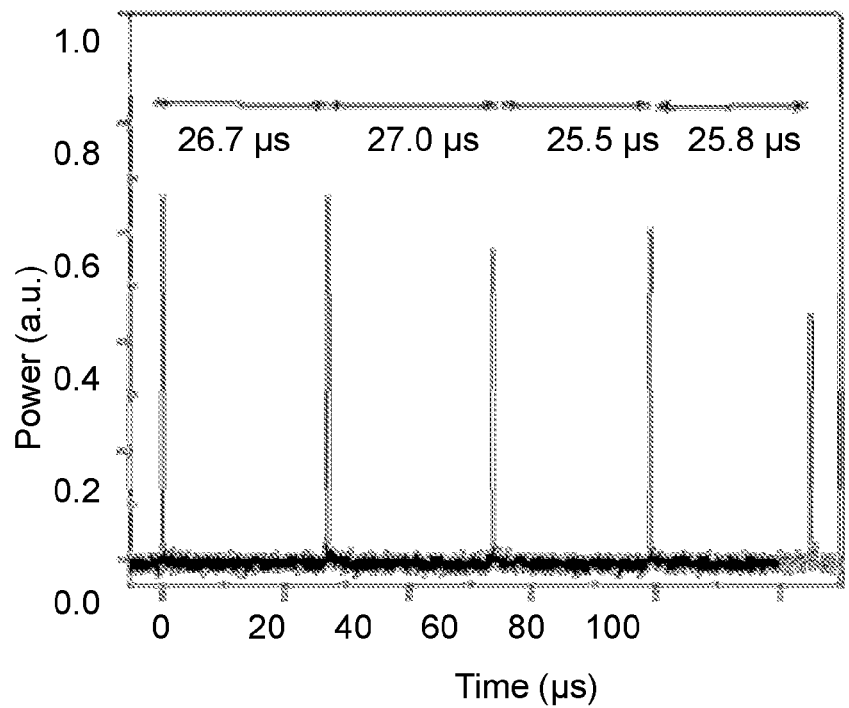
Figure 8B:
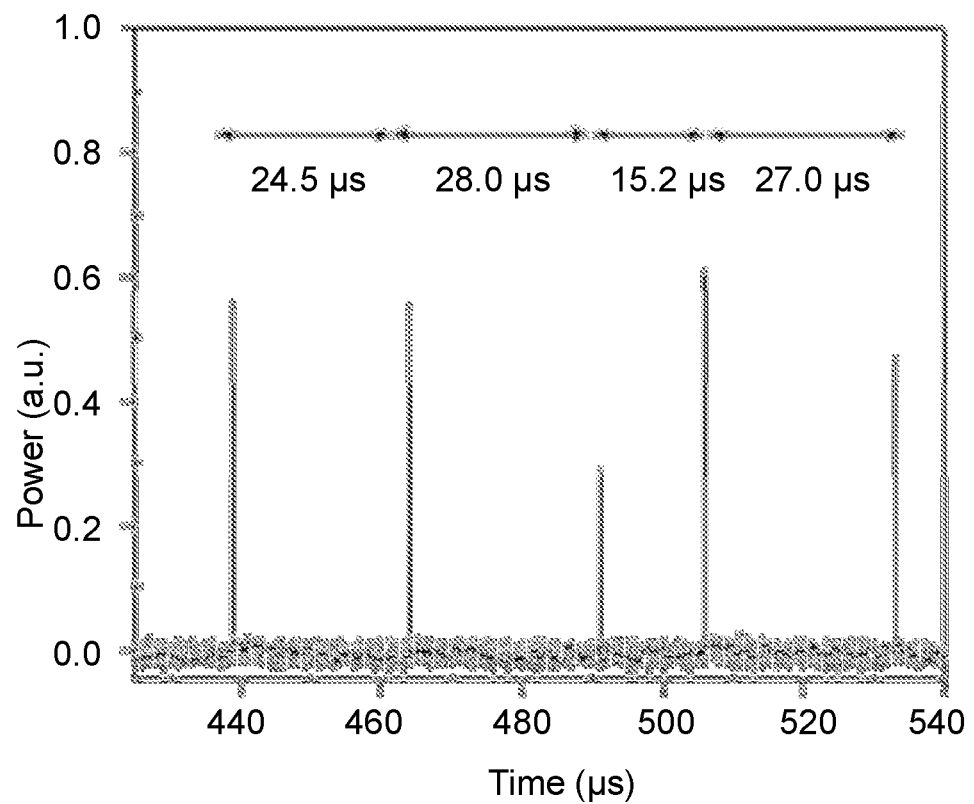

Lastly, FIGS. 8a and 8b represent two additional pulse trains measured from 0 to 540 μs, for a single shot, of the photodetection signal obtained at output S of the device of FIG. 4, where FIG. 8a shows the first five pulses and FIG. 8b shows the last five pulses.

The following can be concluded from the measurements represented in these graphs:
  the space between pulses is not constant and changes randomly within an approximate range of 12 to 28 μs;
  no continuous wave component is observed;
  no temporary windows without pulses are observed in the pumping conditions used;
  the form of the pulses randomly changes, with pulse widths within a range of approximately 30 to 40 ns.

A person skilled in the art would be able to carry out changes and modifications to the embodiments described without departing from the scope of the invention as it is defined in the attached claims.

The invention claimed is:

1. A broadband supercontinuum light emitting device comprising:
    a nonlinear optical fiber;
    a pump system;
    a cavity; and
    an active medium, located inside said cavity, configured and arranged to, by means of a pumping provided by said pump system, generate and emit pulses of laser light towards said nonlinear optical fiber which excite nonlinear effects thereof in order to generate and emit supercontinuum light from an output end of said nonlinear optical fiber,
    wherein said cavity and said active medium are configured so that the pulses of laser light generated and emitted by the active medium are chaotic pulses of light that excite the nonlinear effects of said nonlinear optical fiber so that said nonlinear optical fiber generate and emit the supercontinuum light in the form of pulses of light distributed randomly over time.

2. The device according to claim 1, further comprising at least one element of low reflectivity residing at or near said output end of said nonlinear optical fiber.

3. The device according to claim 2, wherein said element of low reflectivity has a reflectivity value comprised between −10 dB and −70 dB.

4. The device according to claim 3, wherein said element of low reflectivity has a reflectivity value comprised between −30 dB and −50 dB.

5. The device according to claim 2, wherein said element of low reflectivity is a non-collimator end of said nonlinear optical fiber cut at a non-right angle.

6. The device according to claim 2, wherein said element of low reflectivity is a partially reflective collimator end of said output end of said nonlinear optical fiber.

7. The device according to claim 6, wherein said collimator end is a microsphere-shaped fused end, a collimator lens with an anti-reflective coating assembled on said output end of said nonlinear optical fiber, or an external collimator connected to said output end, cut at a non-right angle, of said nonlinear optical fiber.

8. The device according to claim 1, wherein said nonlinear optical fiber is a nonlinear microstructured fiber.

9. The device according to claim 1, wherein said nonlinear optical fiber resides inside said cavity.

10. The device according to claim 9, wherein said active medium comprises a portion of active fiber with an output end connected to an input end of said nonlinear optical fiber, and wherein said pump system comprises a pump diode residing at an input end of said portion of active fiber to emit light inwards.

11. The device according to claim 10, wherein said active fiber has a core doped with at least one element of the group that includes Yb, Er, Nd, Tm, and Ho.

12. The device according to claim 10, further comprising a section of adapting fiber interconnecting the output end of said portion of active fiber with said input end of said nonlinear optical fiber.

13. The device according to claim 10, further comprising at least one element of high reflectivity arranged prior to an input end of said portion of active fiber, before or after the insertion point of the light provided by said pump diode.

14. The device according to claim 13, further comprising:
    an additional portion of optical fiber connected to said input end of said portion of active fiber; and
    a long-period grating acting as a band-pass filter, said active fiber having a maximum spontaneous emission wavelength at which said long-period grating centers,
    wherein a free end of said additional portion of optical fiber ends at a non-right angle, and wherein said at least one element of high reflectivity resides in said additional portion of optical fiber.

15. The device according to claim 1, wherein the device emits pulses of light with a width on the order of nanoseconds and an average emission rate on the order of one thousand pulses per second.

16. The device according to claim 1, wherein all components of the device are made of fiber and are connected by fusion.

17. The device according to claim 11, wherein said core of said active fiber is doped with a combination of elements from the group that includes Yb, Er, Nd, Tm, and Ho.

* * * * *